Oct. 26, 1971  F. D. HICKEY  3,614,924
CONTINUOUS COOKER
Filed Aug. 29, 1969  3 Sheets-Sheet 3
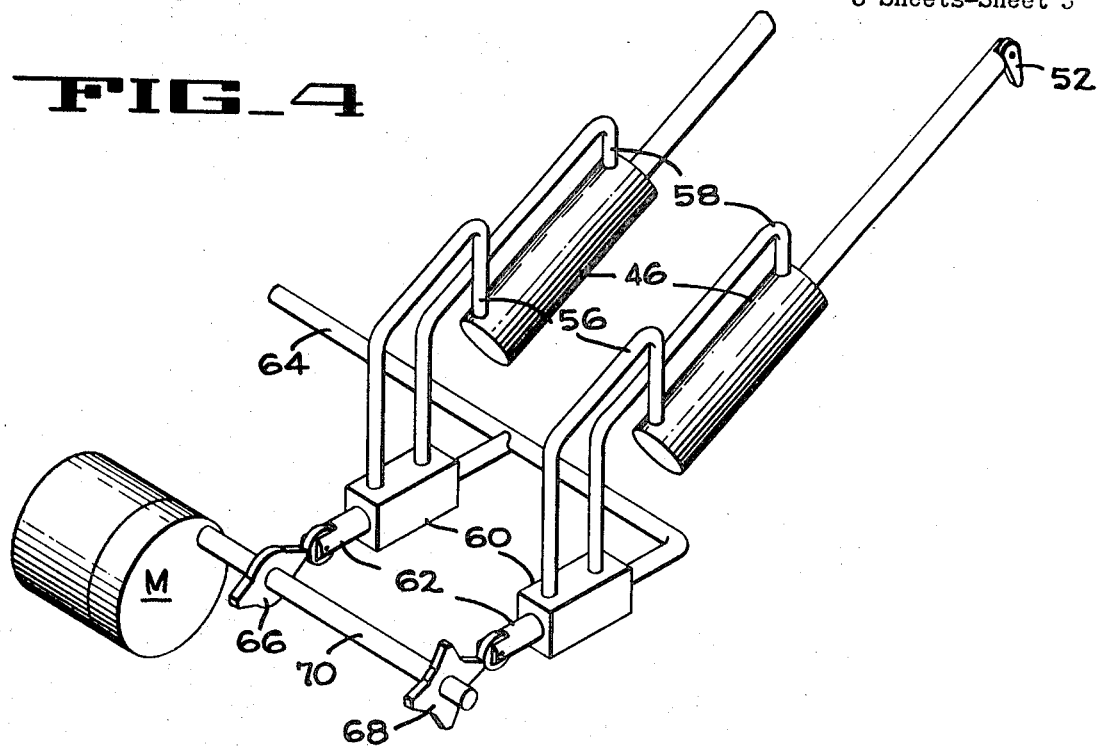
FIG_4
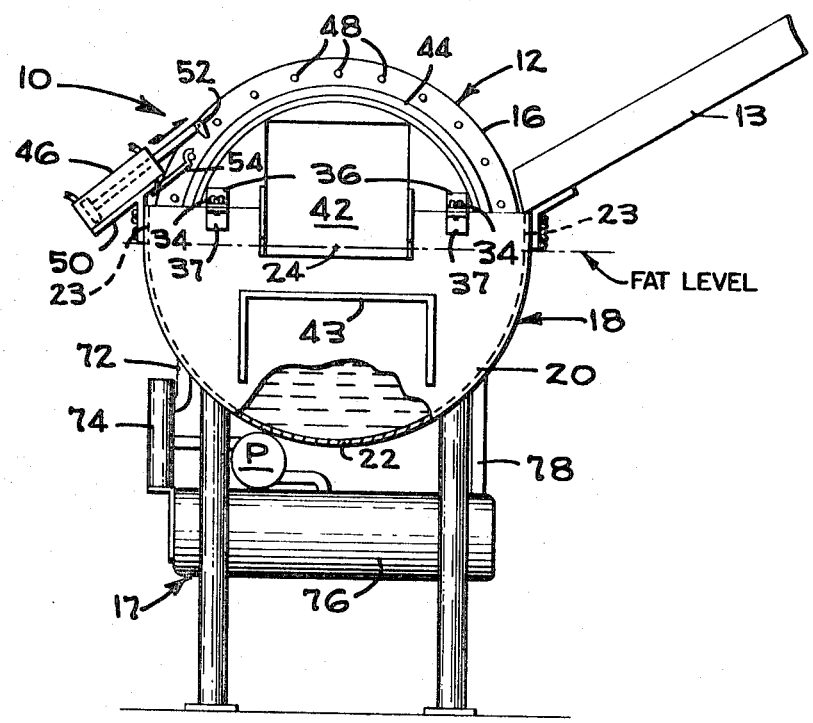
FIG_5

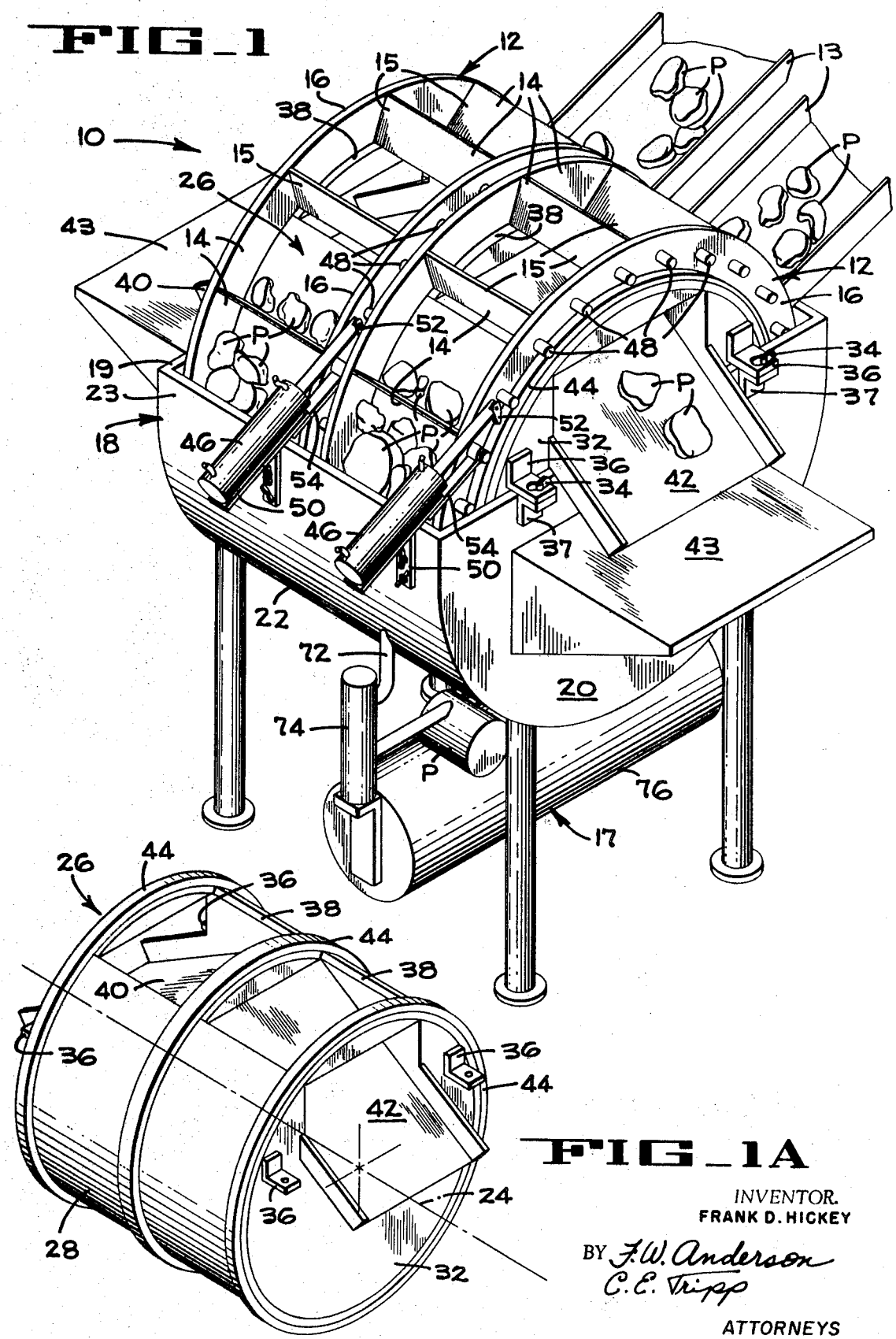

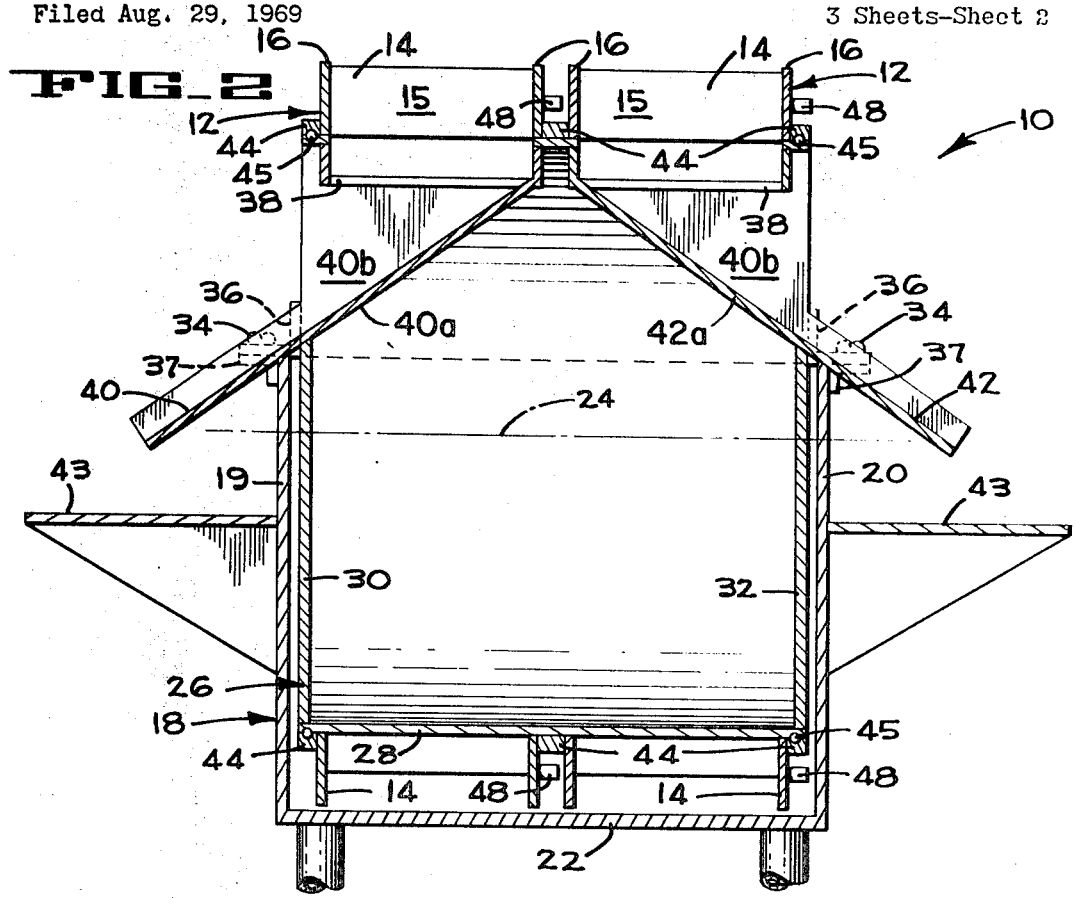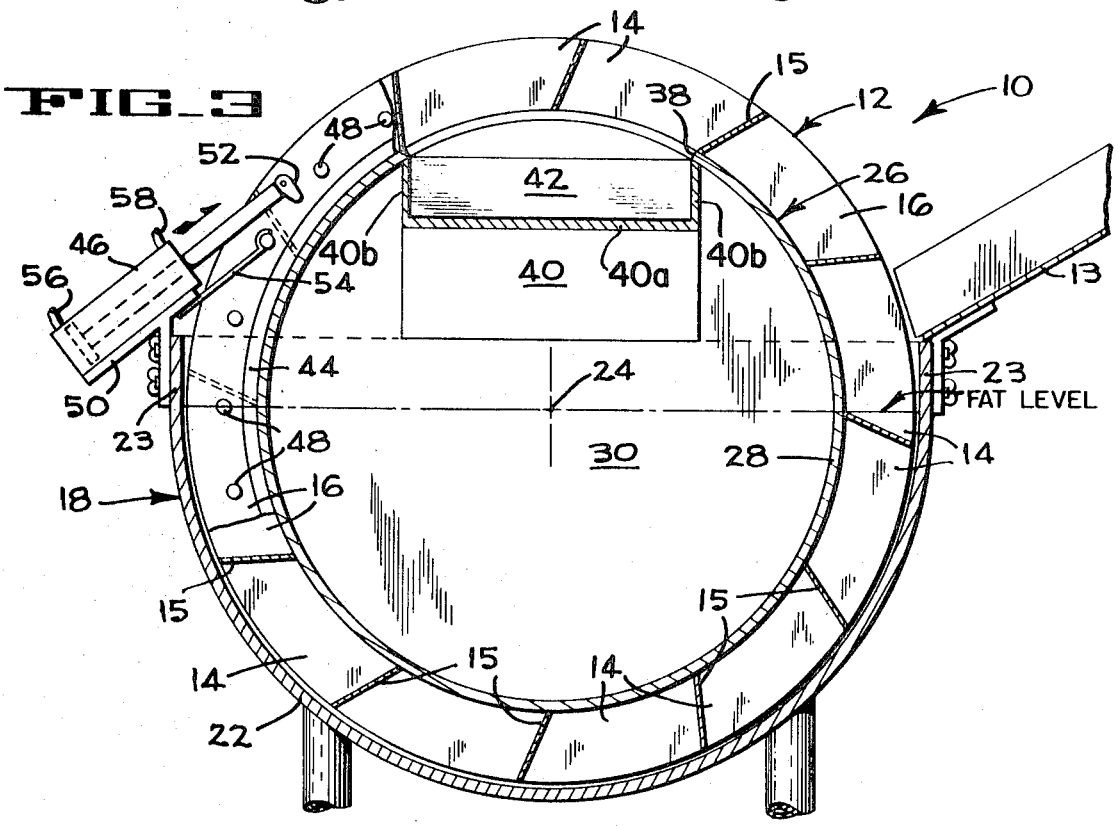

United States Patent Office 3,614,924
Patented Oct. 26, 1971

3,614,924
CONTINUOUS COOKER
Frank David Hickey, San Jose, Calif., assignor to
FMC Corporation, San Jose, Calif.
Filed Aug. 29, 1969, Ser. No. 854,088
Int. Cl. A47j 37/12
U.S. Cl. 99—404     5 Claims

ABSTRACT OF THE DISCLOSURE

A deep fat cooker having multiple annular pocket reels demountably retained on a large cylindrical hub for rotary movement, cooks the food products as the reel pockets move through a heated, liquefied fat bath in an upwardly open semi-cylindrical tank. The hub has closed ends for displacing fat in the tank. The reels require no submerged axles. Independent ratchet drives for the pocket reels provide for different cooking times for the product carried by each reel.

BACKGROUND OF THE INVENTION

Field of the invention

This invention relates to food preparation including treatment of solids such as food products. The embodiment illustrated is for the continuous deep fry cooking of food products.

Description of the prior art

The U.S. Pat. No. 3,022,722, issued to Arvan on Feb. 27, 1962, shows reel partitions extending axially from a vertical side plate. The side plate is rotatably mounted in the tank on an axle which must be submerged in the cooking liquid. A similar construction appears in the U.S. patent to Congelli et al. No. 3,347,152, issued Oct. 17, 1967.

In addition to the immersed axle construction of the above patents, neither shows means for mounting two or more cooking reels for independent rotation on the fixed hub within the tank.

SUMMARY OF THE INVENTION

The cooking apparatus of the present invention provides for simultaneously cooking different products requiring different cooking times. This is accomplished by providing separate pocket reels and by independently driving the reels. The apparatus also provides means for minimizing the amount of cooking fat, and provides structural features which eliminate the chains, bearings, shafts and some of the other parts required in conventional cooking devices. The reels are demountably carried on a relatively large diameter hub, and the portion of the hub immersed in the cooking fat is of closed construction. The hub thus provides a journal for the pocket reels to eliminate the usually required conventional shaft and bearings. The hub also acts as a fat displacement member which occupies a large amount of the space which would otherwise have to be filled with cooking fat.

A separate drive for drive pins projecting from each pocket reel provides for easy disassembly and facilitates individual drive control for the pocket reels.

BRIEF DESCRIPTION OF THE DRAWINGS

FIG. 1 is a diagrammatic isometric of a continuous deep fat cooker embodying the present invention.

FIG. 1A is an isometric of the hub of the cooker shown in FIG. 1.

FIG. 2 is a longitudinal section through the cooker shown in FIG. 1.

FIG. 3 is a transverse section through the cooker.

FIG. 4 is a diagrammatic perspective of the drive means for individually rotating the cooking reels.

FIG. 5 is a diagrammatic end elevation of the overall cooking apparatus.

DESCRIPTION OF THE PREFERRED EMBODIMENT

As mentioned, the apparatus of the present invention is not only useful for cooking food products but for other liquid treatment of such products, such as blanching, dipping, scalding, etc.

FIG. 1 illustrates a deep fry cooker 10 which embodies the structural concept of the present invention with two rotatable pocket reels 12 in which pockets 14 are arranged to carry bulk product, such as french fries, chicken or fish, through a bath of cooking fat. A particular feature of the invention is that multiple pocket reels having individual drive mechanisms are provided, the number of pocket reels being limited only by dimensional considerations and the number of products which can be cooked in the same fat at a given temperature. As later described, the cooking time for each product (with a separate product in each pocket reel) is controlled independent of the cooking time for the other products. The product pockets 14 are defined by transverse partitions 15 that bridge or interconnect two flat end rings 16 of each pocket reel, and the product P is fed into each pocket reel 12 by a gravity feed chute 13.

Temperature controlled cooking fat is heated, filtered, and circulated, by apparatus indicated schematically at 17, for the cooking bath in a floor-mounted cooking tank 18. The cooking tank is provided upright end walls 19 and 20 (FIG. 2), and a semi-cylindrical side and bottom wall portion 22. The major portion of the wall 22 is concentric with the reel axis 24. Above the axis 24, the wall 22 has vertical portions to permit installation and removal of the pocket reels 12. Axis 24 is coincident with the level of the cooking fat so that the lower sectors of the pocket reels are fully immersed. In order to maintain minimum clearance between the pocket reels 12 and the tank 18, the axis 24 is the rotational axis of the pocket reels, as well as the center axis of the tank, and is the longitudinal axis of a hub 26 (FIG. 1A) which forms a support axle for the rotatable pocket reels 12.

The hub 26 is of large diameter cylindrical form and is of closed hollow construction with an arcuate wall 28, and end walls 30 and 32. The wall 28 forms the bottom of the product pockets 14 and a bearing surface for the rings 16 of the pocket reels. The hub 26 and the reels 12 are installed and removed from the tank as a unit. Because the hub has a relatively large diameter and its immersed portion is closed, it forms a displacement member which minimizes the amount of cooking fat necessary to cook the product.

Means for removably mounting the hub 26 (FIGS. 1 and 2) in the tank 18 include four wing bolts 34, that each extend through an aperture in a bracket 36 which is secured to one of the hub walls 30 or 32, and are each threaded into a mating bracket 37 that is secured to one of the tank walls 19 or 20. Thus mounted, the hub 26 is maintained coaxial with the cooking tank 18, and the hub-reel assembly can be readily removed for cleaning and reinstalled in coaxial relation with the cooking tank.

As best shown in FIG. 1A, the curved wall 28 of the hub 26 is provided in its upper sector with discharge apertures 38. Since the wall 28 forms the bottom wall of the product pockets 14, when the pockets of the rotatable reels move over the apertures 38 the product is unsupported, and drops by gravity. The discharge apertures are vertically aligned with inclined gravity discharge chutes 40 and 42 that are a part of the hub 26 and extend over the tank walls 19 and 20. As seen in FIGS. 2 and 3, the chutes 40, 42 have diagonal bottom walls 40a, 42a and side walls 40b, 42b that connect with the hub at the apertures 38 in the upper portion of the hub 26. A shelf 43 may be mounted on the tank 18 beneath each discharge chute for supporting a container for the cooked product.

Three retaining rings 44 (FIGS. 1A and 2) are removably mounted on the hub 26 to axially position the rotatable pocket reels 12, and to retain the reels on the hub so that the reels end hub assembly can be unitarily handled for removal from the cooking tank when the assembly is cleaned. For operating conditions which may necessitate dismantling the reel and hub unit for cleaning, the center ring 44 can be fixed, and the end rings 44 can be retained with rapid action fasteners, such as ball detents, indicated schematically at 45 (FIG. 2).

Each pocket reel 12 is independently driven in order that the product it carries may have a cooking time independent of the product in the other pocket reel or reels. One form of drive for each pocket reel may comprise a ratchet mechanism which includes a double acting fluid operated cylinder, such as an air cylinder 46 and a circular array of drive pins 48 that project axially from one of the pocket reel end rings 16. Each air cylinder is mounted on a bracket 50 which is removably bolted to one upper edge portion of the cooking tank wall 22. The free end of the piston rod of the air cylinder carries a pivotally mounted dog 52 which in known manner depends by gravity against a shoulder portion of the piston rod when the dog is drivingly engaged with a drive pin, and which pivots upward when the piston rod is retracted after a driving stroke.

It will be noted that because the pocket reel 12 has more pockets 14 on the driving side than on the feed side, the reel is overweighted in a direction tending toward reverse rotation. In order to prevent reverse rotation of the pocket reel, a spring leaf 54 (FIG. 5) is mounted on the bracket 50 to be cammed aside by the drive pins 48, and to rebound to a blocking position when a drive pin has cleared its forward end. Because the dog 52 requires clearance to return to a position behind one of the drive pins 48, the drive and return strokes of the piston rod are slightly greater than the distance between adjacent pins.

Timing control of the air cylinders 46 in a manner providing for separate cooking periods for the product in the pocket reels 12 may be accomplished in several different well known ways, one of which is illustrated in FIG. 4. Each air cylinder is connected by conduits 56 and 58 to an air valve 60 which is controlled by a plunger 62. The air valve is arranged to transmit air from a main air line 64 through the conduit 58 to retract the piston rod of the air cylinder when the plunger 62 is not depressed by one lobe of a cam 66 or 68. The cams are mounted on a common shaft 70 that is slowly rotated by a gearhead electric motor M.

The piston rods of the air cylinders 46 are thus normally retracted, and when a cam lobe depresses the air valve plunger 62, the valve directs air into the conduit 56 to extend the piston rod of the air cylinder. The dog 52 then engages one of the drive pins 48 and rotates the pocket wheel 12 one increment of movement, following which the cam lobe releases the plunger and the piston rod is retracted for the next driving stroke. It will be evident that the number of cam lobes determines the number of driving strokes of the associated air cylinder, and that the cam 66 will effect only two driving strokes for every four driving strokes effected by the cam 68. Accordingly, the pocket reel 12 which is controlled by the cam 68 rotates twice as fast and the products are cooked only half as long as products in the other pockets reel 12. It should be mentioned that in practice each cam 66 or 68 may be formed of two discs each having lobes that contact the plungers so that by rotationally positioning one disc relative to its associated disc, different numbers of lobes are active in order to provide various cooking times.

FIG. 5 diagrammatically illustrates a preferred arrangement of conventional components for heating, filtering and circulating the cooking fat, which minimizes the space requirements of the cooking apparatus 10. The cooking tank 18 is provided with an inlet pipe 72 which is connected to the output line of a filter 74 to supply filtered and heated cooking fat to the tank. The fat is circulated by a pump P and is heated, preferably by a thermostatically controlled electrical resistance heater element, in a heating tank 76 which has an inlet pipe 78 that is gravity fed from the cooking tank 18. The motor driven cams and the air valves may also be mounted in an enclosure beneath the cooking tank 18 to conserve floor space.

A general indication of the compactness and efficiency of the cooking apparatus 10 may be had from the following general specifications of one example: With a cooking tank 18 having only a twelve inch radius and pocket reels 12 having pockets 14 about four inches by six inches and three inches deep, french fried potatoes and chicken can be simultaneously cooked at a rate of about 45 pounds of chicken and 112 pounds of potatoes per hour, yet the cooker requires less than four square feet of floor space. With a similar but larger two-pocket reel cooker with pockets of the same length (6 inches) but having a tank with a twenty four inch radius, the output is about 264 pounds of chicken and about 1300 pounds of potatoes per hour. If the smaller cooker herein disclosed is provided with four of the pocket reels 12, it is apparent that the output of the disclosed embodiment of the cooker will be doubled. Thus, the cooking apparatus 10 is capable of meeting different production requirements by using the appropriate number and size of cooking reels 12 for the desired output. It will be apparent, too, that the number of products one cooking apparatus can handle is limited only by products which can be cooked in a common bath of cooking fat, at a given temperature, by regulating the rotational speeds of the individual pocket reels 12. Also, the apparatus has uses for the preparation of food products or the like other than a cooking operation. Mention has been made of the adaptation of the apparatus for blanching, scalding, lye dipping, etc., all of these uses merely represent selections of different treatment liquids and cycle times.

Having thus described the invention, that which is believed to be new, and for which protection by Letters Patent is desired is:

1. Apparatus for the continuous liquid treatment of food products or the like of the type comprising a liquid tank having bottom and side wall portions connected to upright end walls, a generally cylindrical hub mounted between said end walls, a product discharge aperture in an upper portion of said hub, a reel rotatably mounted on said hub, said reel having axially spaced side flanges bridged by radial partitions to form pockets for the products, and means for rotating said reel on the hub; the improvement wherein the interior of said hub is closed by hub end walls and by a product discharge chute forming part of said hub and extending diagonally down from the product discharge aperture in said hub, said chute extending through a hub side wall and past the associated side wall of said tank, said chute being imperforate to the interior of said hub, said reel drive means being completely external of said tank and detachably engaging the reel, and means for detachably mounting said hub on an upper portion of each tank end wall for simultaneous removal of said hub and reel from said tank.

2. The apparatus of claim 1 wherein the bottom and side wall portions of said tank form a semicircle of slightly larger diameter than that of said reel for closing off the reel pockets directly and to minimize the amount of liquid necessary to immerse the product between the tank and the hub.

3. The apparatus of claim 1, wherein the means for rotating said reel comprises a plurality of circumferentially spaced drivers mounted directly on one reel side flange, and a pawl assembly supported on said tank for operating said reel drivers.

4. The apparatus of claim 1, wherein said chute includes a bottom diagonal wall and generally vertical walls connected between the bottom wall and the upper periphery of said hub.

5. Apparatus for the continuous liquid treatment of food products or the like of the type comprising a liquid tank having bottom and side wall portions connected to upright end walls, a generally cylindrical hub mounted between said end walls, product discharge aperture means in an upper portion of said hub, two reels independently rotatably mounted on said hub, said reels each having axially spaced side flanges bridged by partitions to form pockets for the products, and means for rotating said reels on the hub; the improvement wherein said product discharge aperture means comprises two separate apertures in the hub, the interior of said hub being closed by hub end wall and by two chutes forming part of the hub, said chutes being imperforate to the interior of said hub and means for detachably mounting said hub on an upper portion of each tank end wall for simultaneous removal of said hub and reels from said tank.

References Cited

UNITED STATES PATENTS

| | | | |
|---|---|---|---|
| 757,186 | 4/1904 | Fancher | 99—404 UX |
| 1,433,861 | 10/1922 | Vlchek et al. | 134—159 |
| 1,655,886 | 1/1928 | Baehr | 29—125 X |
| 2,701,546 | 2/1955 | Townsend | 118—426 |
| 2,853,937 | 9/1958 | Peck | 99—404 |
| 3,022,722 | 2/1962 | Aruan | 99—404 UX |
| 3,270,662 | 9/1966 | Flodin et al. | 99—404 |
| 3,347,152 | 10/1967 | Congelli et al. | 99—404 X |
| 3,474,726 | 10/1969 | Curtin | 99—404 |

FOREIGN PATENTS

| | | | |
|---|---|---|---|
| 485,307 | 5/1938 | Great Britain | 99—404 |

BILLY J. WILHITE, Primary Examiner

U.S. Cl. X.R.

99—407, 408, 443, 448; 118—19; 134—159; 198—212